United States Patent [19]

Mor

[11] Patent Number: 5,096,939
[45] Date of Patent: Mar. 17, 1992

[54] DEGRADABLE POLYMERIC COMPOSITIONS

[75] Inventor: Ebrahim Mor, Corona Del Mar, Calif.

[73] Assignee: Techmer PM, Rancho Dominguez, Calif.

[21] Appl. No.: 363,528

[22] Filed: Jun. 7, 1989

[51] Int. Cl.$^5$ ................................................ C08K 5/04
[52] U.S. Cl. .................................... 523/125; 524/376; 524/377; 524/378; 524/570
[58] Field of Search ................. 523/125; 524/376, 377, 524/375

[56] References Cited

U.S. PATENT DOCUMENTS

| | | |
|---|---|---|
| 3,200,090 | 8/1965 | Dolce et al. . |
| 3,320,695 | 5/1967 | Moore . |
| 3,454,510 | 7/1969 | Newland et al. . |
| 3,787,526 | 1/1974 | Burns et al. . |
| 3,795,654 | 3/1974 | Kirkpatrick . |
| 3,867,324 | 2/1975 | Clendinning et al. . |
| 3,888,804 | 6/1975 | Swanholm et al. . |
| 3,901,838 | 8/1975 | Clendinning et al. . |
| 3,903,029 | 9/1975 | Young . |
| 3,919,163 | 11/1975 | Clendinning et al. . |
| 3,921,333 | 11/1975 | Clendinning et al. ............. 523/123 |
| 3,923,729 | 12/1975 | Clendinning et al. . |
| 3,931,068 | 1/1976 | Clendinning et al. . |
| 3,968,089 | 7/1976 | Cuscurida et al. . |
| 4,048,065 | 9/1977 | Seun et al. . |
| 4,056,499 | 11/1977 | Taylor . |
| 4,101,720 | 7/1978 | Taylor et al. . |
| 4,165,302 | 8/1979 | Armenti et al. . |
| 4,207,221 | 6/1980 | Tobias et al. . |
| 4,246,387 | 1/1981 | Deutsch . |
| 4,256,851 | 3/1981 | Taylor et al. . |
| 4,261,877 | 4/1981 | Vogt et al. . |
| 4,360,606 | 11/1982 | Tobias et al. ........................ 523/125 |
| 4,698,375 | 10/1987 | Dorman et al. . |

FOREIGN PATENT DOCUMENTS

| | | |
|---|---|---|
| 1128793 | 10/1968 | European Pat. Off. . |
| 2133896 | 4/1972 | Fed. Rep. of Germany ...... 523/125 |
| 2263879 | 7/1973 | Fed. Rep. of Germany ...... 523/125 |
| 732323 | 5/1980 | U.S.S.R. . |
| 1412877 | 11/1977 | United Kingdom . |

OTHER PUBLICATIONS

C. L. George, "Degradable Resin Technology", May 5, 1988.
Organic Chemistry, (Second Edition; Morrison and Boyd), Allyn and Bacon, Inc., Boston, Mass., pp. 687–688, (©1966).

*Primary Examiner*—Joseph L. Schofer
*Assistant Examiner*—Mark D. Sweet
*Attorney, Agent, or Firm*—Banner, Birch, McKie & Beckett

[57] ABSTRACT

There is disclosed a degradable polymeric composition wherein the degradation is initiated by ultraviolet radiation and once initiated the degradation process persists after removal from exposure to ultraviolet radiation and also under anaerobic conditions. The composition comprises an organic polymeric material having dispersed therein a degradation-controlling amount of an additive system consisting essentially of at least one alkoxylated ethylenically unsaturated compound as photo-sensitizer/readily auto-oxidizable additive and, optionally, at least one other readily auto-oxidizable organic substance.

11 Claims, No Drawings

DEGRADABLE POLYMERIC COMPOSITIONS

CROSS-REFERENCE TO RELATED APPLICATIONS

This application is related to copending U.S. patent application Ser. No. 363,529, filed June 7, 1989.

FIELD OF THE INVENTION

This invention relates to novel plastic compositions having useful physical properties and enhanced environmental degradability.

BACKGROUND OF THE INVENTION

The advent of plastics has introduced improved methods of packaging goods. For example, polyethylene and polypropylene plastic films, bags, bottles and styrofoam cups and blister packages have the advantages of being chemically resistant, relatively unbreakable, light in weight and translucent or transparent. The increasing use of plastics in packaging applications has created a serious waste disposal problem. Burning of these plastic materials is unsatisfactory since its adds to air pollution problems. Furthermore, many biodegradable-type materials are packaged in such plastic trash bags which pose an impediment to the natural biodegradation of the contents of the plastic trash bags.

Unlike some other packaging materials, such as paper and cardboard, plastics are not readily destroyed by elements of nature. Thus, burying them is not an effective means of disposal, and can be expensive.

Plastics are a biologically recent development, and hence, are not easily degradable by micro-organisms which degrade most other forms of organic matter and return them to the biological life cycle. As such, plastic containers and packaging films are beginning to litter the countryside after being discarded by careless individuals and are accumulating as a result thereof. Furthermore, the return of degradable materials to the biological life cycle is being hindered by disposing these trash materials in plastic trash bags.

Several approaches to the enhancement of the environmental degradability of plastics have been suggested. These include: (1) the incorporation of particulate biodegradable materials such as starch as "fillers"; (2) the introduction of photoderadation-sensitizing groups into the molecular structure of a polymer by copolymerization of a common monomer with a second monomer possessing such groups; and (3) the incorporation of small amounts of selected additives which accelerate oxidative and/or photo-oxidative degradation. The last approach is particularly attractive for the following reasons. First, the physical properties of the additive-containing compositions are extremely similar to those of the basic polymer. Second, existing compounding and fabrication processes and equipment can be utilized in the manufacture of finished products; hence, the cost of the finished product should be relatively low. Third, the sensitivity of the composition to environmental degradation can be controlled by a proper selection of the type and concentration of additives.

The enhancement of the rate of environmental deterioration of plastics through the use of certain oxidation-promoting additives is known in the prior art. For example, the preparation of degradable polyolefin films containing certain organic derivatives of transition metals is described in U.S. Pat. No. 3,454,510.

While transition metal compounds are effective accelerators of oxidative and photo-oxidative degradation processes, the use of such materials in the preparation of useful plastic compositions having enhanced degradability suffers from several limitations. The high reactivity of plastic compositions containing transition metal compounds leads to rapid degradation during high temperature extrusion and molding processes, with the result that such processes are difficult to control and tend to produce materials having poor mechanical and chemical properties. Some transition metal compounds impart undesired coloration to plastic compositions into which they are incorporated. Furthermore, the toxicity of some transition metal compounds limits their utility as additives in compositions intended for food packaging.

SUMMARY OF THE INVENTION

In accordance with this invention, the reactivity of an organic polymer toward oxidative and/or photo-oxidative degradation is significantly enhanced by the incorporation of at least one alkoxylated ethylenically unsaturated compound as an organic photo-sensitizer. Being ethylenically unsaturated and containing bound oxygen, the organic photo-sensitizer is also readily auto-oxidizable. Examples of such compounds are non-ionic surfactants or dispersants containing ethylenic unsaturation. Optionally, the degradable polymeric composition of the present invention may also incorporate other readily auto-oxidizable substances.

According to the understanding of the state of the art, sensitized photo-oxidative degradation processes involve the photochemical generation of free-radical intermediates, followed by subsequent reactions which are essentially thermal (i.e., non-photochemical). The photo-sensitizing additive increases the rate of formation of free radicals, but does not appreciatively alter the rates of subsequent reactions of those radicals. Consequently, the rate of the overall process, which may be quite rapid initially, can decrease drastically if the sensitizers are consumed during the reaction, or if the source of light is removed.

However, the present invention provides further control of the rate of sensitized photo-degradation through the use of an additive which is not only an organic photo-sensitizer but which is readily auto-oxidizable. The primary function of the "readily auto-oxidizable" portion of the additive is to accelerate those (thermal) auto-oxidation steps which follow the initial photochemical initiation step. The presence of the readily auto-oxidizable portion of the additive may also increase the rate or efficiency of photochemical initiation.

The mechanism by which the addition of the additive having a readily auto-oxidizable portion, and/or the optional other readily auto-oxidizable substance, enhances the susceptibility of the base polymer to environmental degradation has not been established in detail. However, it is believed that the thermal or photochemical auto-oxidation converts the substance into an intermediate, such as a hydroperoxide, particularly at sites of ethylenic unsaturation therein and at sites of bound oxygen in the alkoxy portion thereof. The intermediate then undergoes thermal or photochemical decomposition to form free radicals, such free radicals then initiate auto-oxidation of the polymer. It is further believed that upon initiating photochemical auto-oxidation that auto-oxidation continues after removal from ultraviolet radiation sources and in the absence of gaseous oxygen due to the presence of oxygen in the alkoxylated portion of the additive.

DESCRIPTION OF THE INVENTION

In accordance with this invention, an oxidatively degradable plastic composition is prepared by the admixture of an organic polymeric material and at least one alkoxylated ethylenically unsaturated compound as an organic photo-sensitizer/readily auto-oxidizable organic substance. Optionally, the degradable polymeric composition of the present invention may incorporate other readily auto-oxidizable substances.

Typical organic polymeric materials contemplated include synthetic organic polymers and copolymers, especially polyethylene, polypropylene, poly(1-butene), poly(4-methyl-1-pentene), ethylene-propylene copolymers, ethylene-1-butene copolymers, ethylene-1-hexene copolymers, ethylene-vinyl acetate copolymers, ethylene-ethyl acrylate copolymers, ethylene-acrylic acid copolymers and their salts, polystyrene, rubber-modified polystyrene, styrene-butadiene copolymers, styrene-isoprene copolymers, polyvinyl chloride, poly(vinylidene chloride), polyvinyl fluoride, poly(vinylidene fluoride), polyoxymethylene, poly(ethylene oxide), poly(polypropylene oxide), polyvinyl alcohol, polyvinyl acetate, polyvinyl formal, polyvinyl butyral, poly(methyl acrylate), poly(ethyl acrylate), poly(caprolactam), poly(hexamethyleneadipamide), poly(ethylene terephthalate), vinyl chloride-vinyl acetate copolymers, cellulose acetate, cellulose propionate, cellulose acetate butyrate, ethyl cellulose, methyl cellulose, hydroxyethyl cellulose, hydroxypropyl cellulose, acrylonitrile polymers and copolymers, and methacrylonitrile polymers and copolymers. Preferred polymers include organic hydrocarbon polymers such as polyethylene, polypropylene, poly(4-methyl-1-pentene), and polystyrene.

The phrase "readily auto-oxidizable substance," as used herein, may be defined as a substance which reacts with gaseous oxygen at a reaction rate more rapid than the corresponding reaction, under comparable conditions, of gaseous oxygen with an equal weight of the additive-free polymer into which the alkoxylated ethylenically unsaturated compound is to be combined. Such reaction rates may be compared by the volumetric measurement of the rate of absorption of gaseous oxygen by separate pure samples of the auto-oxidizable substance and the polymer, under conditions of constant temperature and constant oxygen pressure.

In general, the organic photo-sensitizer/readily auto-oxidizable additive is an alkoxylated ethylenically unsaturated compound whose structure contains at least one carbon-hydrogen bond which is activated, with respect to hydrogen-atom abstraction, by an adjacent carbon-carbon double bond or heteroatom, i.e., bound oxygen. Furthermore, the presence of the alkoxylated portion of the compound is also believed to contribute to peroxide formation and the decomposition of the polymer, even under anaerobic conditions.

Examples of such alkoxylated ethylenically unsaturated compounds include alkoxylated aliphatic, cycloaliphatic, heterocyclic, or aromatic alcohols, carboxylic acids, and hydroxy carboxylic acids and esters thereof which contain at least one site of ethylenic unsaturation. Specific examples of alkoxylated ethylenically unsaturated alcohols include, but are not limited to, alkoxylated derivatives of geraniol, linalool, citronellol, allyl alcohol, crotyl alcohol, methallyl alcohol, farnesol, oleyl alcohol, and omega-undecylenyl alcohol. Specific examples of alkoxylated carboxylic acids include, but are not limited to, alkoxylated derivatives of crotonic acid, sorbic acid, oleic acid, linoleic acid and linolenic acid. A hydroxy carboxylic acid contains both hydroxyl and carboxylic acid groups, for example, ricinoleic acid. Preferred alkoxylated ethylenically unsaturated compounds include ethylenically unsaturated fatty-acid polyalkoxylates, ethylenically unsaturated fatty-alcohol polyalkoxylates, alkoxylated ethylenically unsaturated natural oils, and alkoxylated ethylenically unsaturated hydroxy carboxylic acids and esters thereof.

The ethylenically unsaturated fatty-acid polyalkoxylates are preferably of the formula $R-CO-O-(AO)_x-H$, where R is an aliphatic radical containing 8 to 22 carbon atoms and contains at least one site of ethylenic unsaturation, and A is a bivalent radical, preferably selected from the group consisting of $-CH_2CH_2-$ and $-CH(CH_3)CH_2-$. These polymers are made by alkoxylating a fatty acid RCOOH with ethylene oxide, propylene oxide, or mixtures thereof. The above formula is to be considered as covering both block and heteric polymers.

The ethylenically unsaturated fatty-alcohol polyalkoxylates are preferably of the formula $R-O-(AO)_xH$, where R and A have the significance indicated above with respect to the ethylenically unsaturated fatty-acid polyalkoxylates.

In either case, x is an integer of such value as to afford appropriate compatibility with the organic polymer material to facilitate dispersion therein and photo-sensitizing and auto-oxidizing properties, the value depending upon such factors as the number of carbon atoms and amount of ethylenic and/or aromatic unsaturation in R, the number of carbon atoms in the alkylene unit constituting A and the amount of bound oxygen, i.e., number of oxyalkylene units, in the polyalkoxylates. Those skilled in the art of polymer compounding and compatibilization will appreciate how the relevant factors may be balanced to yield a material of desired compatibility with the organic polymeric material utilized in the composition and desired total, molecular weight. Generally, x has a value such as 2 to 100. This structure of the block or heteric polymers, for example of ethylene oxide and propylene oxide, is amply and accurately explained in Chapter 10, "Polyalkylene Oxide Block Copolymers," of Non-Ionic Surfactants, edited by Martin J. Schick and published by Marcel Dekker, Inc., New York, Copyright 1966.

An example of alkoxylated ethylenically unsaturated natural oils is alkoxylated castor oil. A preferred alkoxylated castor oil is ethoxylated castor oil.

Suitable non-ionic surfactant polymers useful in accordance with the present invention may be biodegradable or nonbiodegradable, preferably biodegradable. Non-ionic surfactant polymers are disclosed in U.S. Pat. Nos. 3,770,701 and 4,118,326. Though these references may be slanted toward saturated fatty-acid polyalkoxylates or saturated fatty-alcohol polyalkoxylates, those skilled in the art of non-ionic surfactants will appreciate how to modify the teachings thereof so as to apply to ethylenically unsaturated versions thereof.

Examples of commercially available alkoxylated ethylenically unsaturated compounds include, but are not limited to, T-MAZ 80K available from Mazer Chemicals, Gurnee, Ill.; and Aduct AE-3 available from Procter and Gamble Ind., Orange, Calif. T-MAZ 80K is a food grade polysorbate 80, i.e., sorbitan fatty acid ester of monooleate ethoxylated with about 20 moles of ethylene oxide. Aduct AE-3 is a cocoa fatty alcohol ethoxylated with about 2.9 moles of ethylene oxide.

As noted above, these ethylenically unsaturated alkoxylated compounds fall in the class of non-ionic surfactants, emulsifiers or dispersants. Thus, it was truly surprising when such non-ionic surfactants or dispersants were discovered to be useful as degradation-promoting additives for polymeric compositions.

The degradable polymeric compositions of the present invention may optionally include other readily auto-oxidizable organic substances to work in conjunction with the active additive of the present invention. In general, the other readily auto-oxidizable organic substance will be those whose structure contains at least one carbon hydrogen bond which is activated, with respect to hydrogen-atom abstraction, by an adjacent multiply bonded atom and/or by an adjacent heteroatom, such as oxygen or nitrogen. Typical examples include olefinic compounds, ethers, acetals, ketals, amines, substituted aromatic compounds, aldehydes, organic sulfur compounds, organic boron compounds, organic phosphorous compounds, natural oils, unsaturated fatty acids and alcohols, esters of unsaturated fatty acids and alcohols, and natural and synthetic resins of low molecular weight. Specific examples these and other such other readily auto-oxidizable organic substances are those disclosed by U.S. Pat. Nos. 4,101,720; 4,256,851; and 4,360,606, which are hereby incorporated by reference.

The novel plastic compositions embodying the present invention are prepared by a number of methods. The novel plastic compositions can be compounded according to any one of several known techniques such as direct addition of all the components, master batching wherein any single master batch contains the alkoxylated ethylenically unsaturated compound in a larger proportion relative to the final composition, or any other compounding procedure.

The master batching involves preparation of one or more "packages" or compositions which are subsequently combined into a single homogeneous mixture with the organic polymeric material. In the master batching procedure, the readily auto-oxidizable alkoxylated ethylenically unsaturated compound is initially present at a greater concentration than in the final composition. The separate master batch composition is then combined or blended in proper proportions to produce the degradable polymeric compositions embodying the present invention. This master batching technique is a preferred method in that it should improve the dispersibility of the degradation-promoting additive throughout the degradable polymeric composition.

Another preferred method consists essentially of heating the polymer at a temperature below its decomposition temperature, incorporating the organic photo-sensitizer/readily auto-oxidizable additive and, optionally, the other readily auto-oxidizable organic substance, and mixing the ingredients so as to obtain a substantially uniform mixture. The mixture can then by molded and cooled to form a solid molded article. In the alternative, the mixture can be extruded and cooled to form a solid extrudate. Conventional plastic processing equipment can be used for melting the polymer, mixing the polymer with the organic photo-sensitizer/readily auto-oxidizable additive, and, optionally, the other readily auto-oxidizable organic substances and molding or extruding the resulting mixture. Processing conditions, such as temperature, time, and pressure, will be obvious to those skilled in the art.

Yet another preferred process for preparing the novel plastic compositions of this invention consists essentially of blending the organic photo-sensitizer/readily auto-oxidizable additive, and, optionally, the other readily auto-oxidizable organic substances with a solid polymer to obtain a substantially uniform mixture. The polymer is preferably in the form of pellets, granules or powder. Conventional plastic processing equipment can be used in the blending operation. The processing conditions will be obvious to those skilled in the art. The resulting mixture can be melted at a temperature below the decomposition temperature of the polymer and additive(s). The resulting melt can be extruded or molded and cooled to form a solid extrudate or molded article.

A preferred process for preparing the novel plastic composition of this invention consists essentially of casting a film from a composition of the polymer, the additive and, optionally, the other readily auto-oxidizable organic substance in an inert solvent or diluent. By "inert solvent" is meant that the solvent does not react with the polymer, the additive or the other readily auto-oxidizable substance. Use of this method is particularly attractive for preparing degradable coatings or adhesive materials.

The additive hereof and/or the other readily auto-oxidizable substance can also be applied as a solution, slurry, or paste to the surface of the plastic article. Such surface application can comprise brushing, roller coating, spraying, dipping or printing (i.e., uniformly or image-wise) on the surface of the article, in the presence or absence of a solvent. If desired, the treated article can then be heated to promote diffusion of the additive hereof and/or the other readily auto-oxidizable substance into the polymer.

The novel plastic compositions of this invention can be prepared at the time of disposal of conventional plastic articles. For example, a plastic article can be crushed, milled or ground, and subsequently or simultaneously mixed with the additive hereof and, optionally, the other readily auto-oxidizable substance. In the practice of this specific embodiment, the use of readily auto-oxidizable waste materials, such as wastes generated during food processing, is contemplated.

In one preferred processing embodiment of the present invention, a degradable plastic composition consisting of an organic polymer and a photo-sensitizer/readily auto-oxidizable additive and, optionally, the other readily auto-oxidizable substance is prepared and shaped by conventional means. The resulting film, sheet, fiber, tube or molded article is subsequently treated in such a manner as to convert the plastic, via controlled partial oxidation, to a more readily degradable composition. This treatment may be carried out by any of several methods, including exposure to ultraviolet or ionizing radiation, heating in air or oxygen, surface treatment with a flame or electrical discharge, immersion in solution of oxidizing agents, etc. In certain cases, it may be possible to combine high-temperature processing and controlled partial oxidation into a single step; an example would be extrusion of an oxidatively degradable plastic composition into an oxygen atmosphere.

In another preferred embodiment of the present invention, a cellular degradable thermoplastic material is formed from a composition containing a polymer, the photo-sensitizer/readily auto-oxidizable additive, and a blowing agent and, optionally, the other readily auto-oxidizable substance. The blowing agent is a substance which releases a substantial volume of gas under appropriate conditions, either by chemical decomposition to gaseous products (chemical blowing agents) or by physical vaporization (physical blowing agents). Suitable chemical blowing agents include azodicarbonamide, azobisisobutyronitrile, 4-4'-oxybis(benzene sulfonyl hydrazide), and sodium bicarbonate. Suitable physical blowing agents include nitrogen, carbon dioxide, trichlorofluoromethane and dichlorodifluoromethane. As an example, a cellular (foamed) degradable plastic material may be prepared by melting and extruding a mixture of a polyolefin, the photo-sensitizer/readily auto-oxidizable additive hereof, and a physical blowing agent. The processing condition similar to those employed for the fabrication of extruded polyolefin foams lacking the additive hereof and/or the other readily auto-oxidizable substance may be used. If desired, a degradable composite may be prepared by co-extruding a cellular degradable plastic material with a non-cellular composition of the same or a different polymer. The latter non-cellular layer may also be modified by the incorporation of the additive hereof, i.e., the alkoxylated ethylenically unsaturated compound. The foam or composite may be oriented, uniaxially or biaxially, in the course of extrusion.

The novel degradable polymeric compositions can also contain non-reactive additives. By the term "non-reactive additives," it is meant a modifying additive, filler or reinforcement commonly used in the formulation of plastic compositions which does not materially interfere with the degradation process. For example, the compositions of the invention may contain, in addition to the essential polymer and the alkoxylated ethylenically unsaturated compound, such additives as lubricants, plasticizers, dyes, pigments, anti-static agents, anti-block agents, slip agents, processing aids, adhesion promoters, flame retardants, particulate fillers, and fibrous reinforcements. In particular, the use of such particulate fillers and reinforcements as calcium carbonate, talc, clays, glass, and mica is contemplated.

The composition may further contain naturally occurring biodegradable products such as animal protein and those disclosed by U.S. Pat. No. 3,867,324, which is hereby incorporated by reference. Such naturally occurring biodegradable products are believed to attract microorganisms, such as bacteria and fungi, and small insects, such as woodlice, which are then believed to consume the polymer sand. The polymer sand is the end product of the environmental degradation of the degradable polymeric composition hereof produced by the degradative action of the alkoxylated ethylenically unsaturated compound upon the organic polymeric material, such as polyolefins, in the degradable polymeric compositions hereof.

Antioxidants and stabilizers may also be utilized in the degradable polymeric compositions embodying the present invention. In some cases, it may be necessary to add an antioxidant or stabilizer to permit high temperature processing, even though such additive may slow the degradation process. In other cases, it may be desirable to retard degradation of the composition for a limited period of time. The preferred antioxidant for this purpose is tetrakis[methylene(3,5-di-tert-butyl-4-hydroxy-hydrocinnamate)]methane. This composition is sold as IRGANOX 1010 by Ciba-Geigy and disclosed by U.S. Pat. Nos. 3,285,855 and 3,644,482. Other suitable antioxidants are disclosed in U.S. Pat. No. 3,867,324, this patent previously incorporated by reference herein. The antioxidant(s) is used in a total amount of about 0.001 to about 0.05 percent by weight of the polymer.

It is contemplated that the degradable plastic composition of this invention will ordinarily contain about 50 to 99.9 percent by weight of the organic polymer, about 0.01 percent to about 50.0 percent by weight of the photo-sensitizer/readily auto-oxidizable additive, and from 0 to about 50 percent by weight of the other readily auto-oxidizable organic substance. The quantities of any non-reactive additives should not be calculated in such percentages.

In a preferred embodiment, the composition is about 98 to about 90 percent by weight low-density polyethylene, about 1 to about 5 percent by weight linear low-density polyethylene, and about 1 to about 5 percent by weight of ethoxylated castor oil. The low-density polyethylene and linear low-density polyethylene each preferably has a density of less than 0.925 grams per cubic centimeter.

The practice of this invention is particularly suitable for preparing degradable secondary packaging containers, such as holders or wrap for bottles and cans and for trash bags. Examples of such packaging articles are disclosed in U.S. Pat. Nos. 3,086,651; 2,874,835; 3,750,876; 3,752,305; 3,747,750; 3,817,373; 3,084,792; 3,476,237; 4,444,828; 4,505,970; and 4,511,609, wherein the degradable polymer composition of the present invention is substituted for the polyolefins utilized therein. The compositions of the present invention may also be utilized in much films and transplanter containers.

The following examples are for illustrative purposes only and are not meant to limit the claimed invention in any manner.

EXAMPLE 1

Effect of Ethoxylated Castor Oil

In this example, the degradative properties of an alkoxylated ethylenically unsaturated compound on a polymeric material are investigated. The alkoxylated ethylenically unsaturated compound utilized was ethoxylated castor oil. The polymeric material was low density polyethylene (LDPE).

Three samples were prepared. Sample E utilized the ethoxylated castor oil. Sample D utilized castor oil (non-ethoxylated) as a control. Sample I was also a control without castor oil.

Sample E and D were prepared utilizing a concentrate (master-batch). The concentrates for Samples E and D were formulated as shown in Table 1.

The mixing equipment utilized to prepare concentrates E and D was a Rheocord System 40 torque rheometer with a Rheomix Type 600 mixer. The equipment's three zones were set at 120° C. For Concentrate E, the mixer was programmed for 50 rpm for three minutes, then increased to 90 rpm for three minutes to complete the flux of the mixture. For Concentrate D, the mixer was programmed for 50 rpm for three minutes, then increased to 70 rpm for two minutes to complete the flux of the mixture.

Concentrates E and D were each recovered from the mixing chamber of the Rheomix Type 600 mixer. Both concentrates were in bulk form and light buff in color. Concentrates E and D were each then pressed into a thin sheet of material known as a "pressout". The respective pressout was then cut into small size square chips (⅛ inch × ⅛ inch in size) called "pellets." The press machine used to make the pressouts was a Carver Lab Press, Model No. 2731, Ser. No. 2731-17.

TABLE 1

| Formulation | Concentrate E % w | Concentrate E grams | Concentrate D % w | Concentrate D grams |
|---|---|---|---|---|
| LLDPE[a] | 90.0 | 40.500 | 90.0 | 40.500 |
| Hydrolyzed Protein[b] | 2.5 | 1.125 | 2.5 | 1.125 |
| Ethoxylated Castor Oil[c] | 2.5 | 1.125 | — | — |
| Non-ethoxylated Castor Oil[d] | — | — | 2.5 | 1.125 |
| Calcium Carbonate[e] | 5.0 | 2.250 | 5.0 | 2.250 |
| TOTAL | 100.0 | 45.000 | 100.0 | 45.000 |

[a]Linear low density polyethylene, 2 melt index resin, solid, powder form.
[b]Hydrolyzed animal protein, low heat stability material, in solid powder form available as Polypro ® from Geo. A. Hormel & Co.: Industrial Products Division, Austin, MN.
[c]20 mole ethoxylated castor oil; viscous amber liquid.
[d]Viscous amber liquid.
[e]Uncoated calcium carbonate, in solid, powder form.

Low density polyethylene (LDPE) and the pellets of concentrates E and D, respectively, were combined in a plastic bag and physically mixed. LDPE had a melt index of 2. About 392 grams (98% w) of LDPE and about 8 grams (2% w) of the respective concentrate were combined in order to prepare Samples E and D, respectively.

The physically mixed ingredients for Samples E and D were, respectively, fed into the hopper of a blown film machine to prepare blown films of Samples E and D. The blown film machine was a San Chih Machinery, Inc. Model MNE-42, HDPE Blown Film Machine. The extruder thereof had a screw diameter of 42 mm, a screw ratio of 30:1 L/D, screw speed of 110 rpm and a die diameter of 50 mm. The temperature settings for the extruder zones were zones one and two at about 160° C., zone three at about 165° C. and zone four at about 190° C. Other settings for the blown film machine were a take-up roller speed of about 400 rpm, film thickness of about 0.9 mil to about 1.2 mil and a blow-up ratio of about 2:1.

As a control, Sample I using Concentrate I was prepared. Concentrate I was composed of LDPE (75.25% w; 37.625 grams) and LLDPE (24.75% w; 12.375 grams). The LDPE was film grade low density polyethylene specified as 2 melt index resin in solid pellet form. The LLDPE was as with Concentrates E and D.

The mixing equipment for preparing Concentrate I was the same as used to prepare Concentrates E and D with the following changes in settings. The three zones were at about 110° C. with a roller speed at 70 rpm for three minutes to complete the flux of the mixture. Concentrate I when removed from the mixing chamber was in bulk form and had no appearance of color. Pellets of Concentrate I were prepared in the same manner and dimensions as those of Concentrates E and D.

Blown films of Sample I were prepared with Concentrate I (10% w; 40 grams) and LDPE (90% w; 360 grams) using the same equipment and settings used to prepare the blown film of Samples E and D.

Specimens according to ASTM-D-882-83 were prepared from the blown films of Samples E, D and I. These specimens were subjected to a preset number of exposure cycles with each exposure cycle consisting of a 6 hour UV cycle at 70° C. followed by an 18 hour condensation cycle at 50° C. (according to ASTM G-53-77). Four (4) specimens from each of the three (3) samples per multiples of a three (3) exposure cycle period were tested in accordance with ASTM-D-882-83 using an initial grip separation of about 1.00 inch and a test speed of about 0.50 inches per minute. The arithmetic mean and standard deviation from each of the test series are reported in Table 2. The Breaking Factor is reported in units of lbs/inch width and Ultimate Elongation is reported as percent.

TABLE 2

| Interval | Specimen | SAMPLE E Breaking Factor (lbs/in width) | SAMPLE E Ultimate Elongation (percent) | SAMPLE D[a] Breaking Factor (lbs/in width) | SAMPLE D[a] Ultimate Elongation (percent) | SAMPLE I Breaking Factor (lbs/in width) | SAMPLE I Ultimate Elongation (percent) |
|---|---|---|---|---|---|---|---|
| 0 hour: | 1 | 2.18 | 200 | 2.78 | 150 | 3.10 | 130 |
| (0 exposure | 2 | 2.06 | 180 | 2.08 | 140 | 2.96 | 150 |
| cycles) | 3 | 1.94 | 170 | 2.42 | 130 | 2.82 | 130 |
|  | 4 | 1.94 | 150 | 2.00 | 140 | 3.18 | 120 |
|  | Mean | 2.03 | 180 | 2.32 | 140 | 3.02 | 130 |
|  | std. dev. | 0.11 | 21 | 0.36 | 8 | 0.16 | 13 |
| 72 hour: | 1 | 2.06 | 110 | 1.76 | 90 | 1.92 | 60 |
| (3 exposure | 2 | 2.02 | 130 | 1.48 | 110 | 2.18 | 110 |
| cycles) | 3 | 1.68 | 150 | 1.50 | 110 | 2.06 | 80 |
|  | 4 | 1.70 | 160 | — | — | 2.24 | 100 |
|  | Mean | 1.86 | 140 | 1.58 | 100 | 2.10 | 90 |
|  | std. dev. | 0.20 | 22 | 0.16 | 12 | 0.14 | 22 |
| 144 hour: | 1 | 1.84 | 80 | 1.68 | 50 | 1.02 | 80 |
| (6 exposure | 2 | 1.96 | 80 | 1.90 | 80 | 1.20 | 100 |
| cycles) | 3 | 1.78 | 60 | 1.40 | 40 | 0.98 | 90 |
|  | 4 | 1.98 | 90 | 2.06 | 80 | 1.22 | 100 |
|  | Mean | 1.89 | 80 | 1.76 | 60 | 1.10 | 90 |
|  | std. dev. | 0.10 | 13 | 0.29 | 21 | 0.12 | 10 |
| 216 hour: | 1 | 0.74 | 30 | 0.96 | 50 | 0.86 | 50 |
| (9 exposure | 2 | 0.76 | 40 | 1.08 | 70 | 0.86 | 60 |
| cycles) | 3 | 1.02 | 50 | 1.34 | 70 | 1.00 | 60 |
|  | 4 | 0.80 | 30 | 1.32 | 60 | 1.00 | 60 |
|  | Mean | 0.83 | 40 | 1.18 | 60 | 0.93 | 60 |
|  | std. dev. | 0.13 | 10 | 0.19 | 10 | 0.08 | 5 |
| 288 hour: | 1 | 1.04 | 60 | — | — | 1.38 | 80 |
| (12 exposure | 2 | 0.42 | 10 | — | — | 1.38 | 50 |
| cycles) | 3 | 0.62 | 10 | — | — | 1.68 | 70 |

TABLE 2-continued

| Interval | Specimen | SAMPLE E | | SAMPLE D[a] | | SAMPLE I | |
|---|---|---|---|---|---|---|---|
| | | Breaking Factor (lbs/in width) | Ultimate Elongation (percent) | Breaking Factor (lbs/in width) | Ultimate Elongation (percent) | Breaking Factor (lbs/in width) | Ultimate Elongation (percent) |
| | 4 | 0.80 | 50 | — | — | 1.16 | 50 |
| | Mean | 0.72 | 30 | — | — | 1.40 | 60 |
| | std. dev. | 0.26 | 26 | — | — | 0.21 | 15 |

[a]No further apparent degradation observed when comparing mean Ultimate Elongation at 144 hour and 216 hour intervals so no further testing was performed.

As is readily apparent from Table 2, polymer compositions containing an alkoxylated ethylenically unsaturated compound experience a higher rate of degradation than the non-alkoxylated equivalent thereof and the polymer itself. (Sample E versus Samples D and I).

EXAMPLE 2

Effect of Concentration of Ethoxylated Castor Oil

In this example, the effect of the concentration of the alkoxylated ethylenically unsaturated compound on the degradative properties thereof on a polymeric material are investigated. The alkoxylated ethylenically unsaturated compound utilized was ethoxylated castor oil.

The polymer material was low-density polyethylene (LDPE).

New Sample F was prepared utilizing Concentrate E in the same manner as Sample E of Example 1 with the exception that Concentrate E was present at 3% w based on the weight of the composition. Specifically, about 388 grams (97% w) of LDPE and about 12 grams (3% w) of Concentrate E were combined to prepare Sample F utilizing the procedure for preparing Sample E in Example 1. The same equipment and conditions used to prepare Sample E were utilized in preparing Sample F.

Specimens according to ASTM-D-882-83 were prepared from the blown films of Sample F. As in Example 1, the specimens were subjected to a preset number of exposure cycles as defined in Example 1 (according to ASTM G-53-77). Four (4) specimens from Sample F per multiples of a three (3) exposure cycle period were tested in accordance with ASTM-D-882-83 using an initial grip separation of about 1.00 inch and a test speed of about 0.50 inches per minute. The arithmetic mean and a standard deviation from each of the test series are reported in Table 3 for Samples E, F and I (control). The Breaking Factor is reported in units of lbs/inch width and Ultimate Elongation is reported as percent.

TABLE 3

| Interval | Specimen | SAMPLE E | | SAMPLE F | | SAMPLE I | |
|---|---|---|---|---|---|---|---|
| | | Breaking Factor (lbs/in width) | Ultimate Elongation (percent) | Breaking Factor (lbs/in width) | Ultimate Elongation (percent) | Breaking Factor (lbs/in width) | Ultimate Elongation (percent) |
| 0 hour: | 1 | 2.18 | 200 | 1.88 | 150 | 3.10 | 130 |
| (0 exposure | 2 | 2.06 | 180 | 1.82 | 150 | 2.96 | 150 |
| cycles) | 3 | 1.94 | 170 | 2.68 | 170 | 2.82 | 130 |
| | 4 | 1.94 | 150 | 2.18 | 180 | 3.18 | 120 |
| | Mean | 2.03 | 180 | 2.14 | 160 | 3.02 | 130 |
| | std. dev. | 0.11 | 21 | 0.39 | 15 | 0.16 | 13 |
| 72 hour: | 1 | 2.06 | 110 | 1.78 | 90 | 1.92 | 60 |
| (3 exposure | 2 | 2.02 | 130 | 1.20 | 60 | 2.18 | 110 |
| cycles) | 3 | 1.68 | 150 | 1.46 | 100 | 2.06 | 80 |
| | 4 | 1.70 | 160 | 1.86 | 100 | 2.24 | 100 |
| | Mean | 1.86 | 140 | 1.58 | 90 | 2.10 | 90 |
| | std. dev. | 0.20 | 22 | 0.30 | 19 | 0.14 | 22 |
| 144 hour: | 1 | 1.84 | 80 | 1.60 | 80 | 1.02 | 80 |
| (6 exposure | 2 | 1.96 | 80 | 1.26 | 70 | 1.20 | 100 |
| cycles) | 3 | 1.78 | 60 | 1.28 | 70 | 0.98 | 90 |
| | 4 | 1.98 | 90 | 1.60 | 80 | 1.22 | 100 |
| | Mean | 1.89 | 80 | 1.44 | 80 | 1.10 | 90 |
| | std. dev. | 0.10 | 13 | 0.19 | 6 | 0.12 | 10 |
| 216 hour: | 1 | 0.74 | 30 | 1.24 | 50 | 0.86 | 50 |
| (9 exposure | 2 | 0.76 | 40 | 1.00 | 30 | 0.86 | 60 |
| cycles) | 3 | 1.02 | 50 | 1.06 | 40 | 1.00 | 60 |
| | 4 | 0.80 | 30 | 1.12 | 40 | 1.00 | 60 |
| | Mean | 0.83 | 40 | 1.10 | 40 | 0.93 | 60 |
| | std. dev. | 0.13 | 10 | 0.10 | 8 | 0.08 | 5 |
| 288 hour: | 1 | 1.04 | 60 | 1.10 | 40 | 1.38 | 80 |
| (12 exposure | 2 | 0.42 | 10 | 0.82 | 10 | 1.38 | 50 |
| cycles) | 3 | 0.62 | 10 | 0.98 | 20 | 1.68 | 70 |
| | 4 | 0.80 | 50 | 1.02 | 30 | 1.16 | 50 |
| | Mean | 0.72 | 30 | 0.98 | 20 | 1.40 | 60 |
| | std. dev. | 0.26 | 26 | 0.12 | 13 | 0.21 | 15 |

As is evident from Table 3, both Samples E and F experienced a similar rate of decrease in Ultimate Elongation from 0 to 216 hours of UV exposure time. However, at the end of 288 hours of UV exposure time, Sample F which contained about 0.075% by weight of ethoxylated castor oil showed a higher rate of decrease in Ultimate Elongation than Sample E which contained 0.05% by weight ethoxylated castor oil. Therefore, the rate of degradation of the polymer composition can be enhanced by increasing the concentration of the alkoxylated ethylenically unsaturated compound. It is further apparent from Table 3 that both Samples E and F experienced a higher rate of decrease in Ultimate Elongation than Sample I (control).

EXAMPLE 3

Effective Concentration of LLDPE

In this example, the effects of the concentration of LLDPE on the degradative properties of an alkoxylated ethylenically unsaturated compound on a polymeric material are investigated. The alkoxylated ethylenically unsaturated compound utilized was ethoxylated castor oil. The polymeric material was low-density polyethylene (LDPE).

New Sample A was prepared in the same manner as Sample E in Example 1 with the exception that Concentrate A was substituted for Concentrate E therein. Concentrate A was prepared in the same manner as Concentrate E but was formulated according to the formulation shown in Table 4.

TABLE 4

| Formulation | Concentrate E % w | Concentrate E grams | Concentrate D % w | Concentrate D grams |
|---|---|---|---|---|
| LLDPE[a] | 90.0 | 40.500 | 87.5 | 39.375 |
| Hydrolyzed Protein[b] | 2.5 | 1.125 | 5.0 | 2.250 |
| Ethoxylated Castor Oil[c] | 2.5 | 1.125 | 2.5 | 1.125 |
| Calcium Carbonate[d] | 5.0 | 2.250 | 5.0 | 2.250 |
| TOTAL | 100.0 | 45.000 | 100.0 | 45.000 |

[a]Linear low density polyethylene, 2 melt index resin, solid, powder form.
[b]Hydrolyzed animal protein, low heat stability material, in solid powder form available as Polypro ® from Geo. A. Hormel & Co.: Industrial Products Division, Austin, MN.
[c]20 mole ethoxylated castor oil; viscous amber liquid.
[d]Uncoated calcium carbonate, in solid, powder form.

Specimens according to ASTM-D-882-83 were prepared from blown films of Sample A. The specimens were subjected to a preset number of exposure cycles as defined in Example 1 (according to ASTM G-53-77). Four (4) specimens of Sample A per multiples of a three (3) cycle period were tested in accordance with ASTM-D-882-83 using an unitial grip separation of about 1.00 inch and a test speed of about 0.50 inches per minute. The arithmetic mean and standard deviation from each of the test series are reported in Table 5 together with those of Samples E and I for ease of comparison.

TABLE 5

| | | SAMPLE A | | SAMPLE E | | SAMPLE I | |
|---|---|---|---|---|---|---|---|
| Interval | Specimen | Breaking Factor (lbs/in width) | Ultimate Elongation (percent) | Breaking Factor (lbs/in width) | Ultimate Elongation (percent) | Breaking Factor (lbs/in width) | Ultimate Elongation (percent) |
| 0 hour: | 1 | 4.10 | 160 | 2.18 | 200 | 3.10 | 130 |
| (0 exposure | 2 | 4.06 | 140 | 2.06 | 180 | 2.96 | 150 |
| cycles) | 3 | 4.18 | 190 | 1.94 | 170 | 2.82 | 130 |
| | 4 | 4.04 | 190 | 1.94 | 150 | 3.18 | 120 |
| | Mean | 4.10 | 170 | 2.03 | 180 | 3.02 | 130 |
| | std. dev. | 0.06 | 24 | 0.11 | 21 | 0.16 | 13 |
| 72 hour: | 1 | 2.44 | 90 | 2.06 | 110 | 1.92 | 60 |
| (3 exposure | 2 | 2.40 | 90 | 2.02 | 130 | 2.18 | 110 |
| cycles) | 3 | 2.42 | 100 | 1.68 | 150 | 2.06 | 80 |
| | 4 | 2.30 | 100 | 1.70 | 160 | 2.24 | 100 |
| | Mean | 2.39 | 95 | 1.86 | 140 | 2.10 | 90 |
| | std. dev. | 0.06 | 6 | 0.20 | 22 | 0.14 | 22 |
| 144 hour: | 1 | 2.04 | 70 | 1.84 | 80 | 1.02 | 80 |
| (6 exposure | 2 | 2.00 | 70 | 1.96 | 80 | 1.20 | 100 |
| cycles) | 3 | 2.00 | 60 | 1.78 | 60 | 0.98 | 90 |
| | 4 | 1.88 | 40 | 1.98 | 90 | 1.22 | 100 |
| | Mean | 1.98 | 60 | 1.89 | 80 | 1.10 | 90 |
| | std. dev. | 0.07 | 14 | 0.10 | 13 | 0.12 | 10 |
| 216 hour: | 1 | 1.92 | 30 | 0.74 | 30 | 0.86 | 50 |
| (9 exposure | 2 | 2.00 | 30 | 0.76 | 40 | 0.86 | 60 |
| cycles) | 3 | 2.00 | 40 | 1.02 | 50 | 1.00 | 60 |
| | 4 | 2.00 | 40 | 0.80 | 30 | 1.00 | 60 |
| | Mean | 1.98 | 35 | 0.83 | 40 | 0.93 | 60 |
| | std. dev. | 0.04 | 6 | 0.13 | 10 | 0.08 | 5 |
| 288 hour: | 1 | 1.74 | 20 | 1.04 | 60 | 1.38 | 80 |
| (12 exposure | 2 | 1.58 | 10 | 0.42 | 10 | 1.38 | 50 |
| cycles) | 3 | * | * | 0.62 | 10 | 1.68 | 70 |
| | 4 | * | * | 0.80 | 50 | 1.16 | 50 |
| | Mean | 1.66 | 20 | 0.72 | 30 | 1.40 | 60 |
| | std. dev. | 0.11 | 7 | 0.26 | 26 | 0.21 | 15 |

*Specimen was degraded to the point that the test could not be performed.

As is apparent from Table 5, Sample E possessed improved physical strength relative to Sample A over the entire test period. The difference in physical strength is believed to be due to the increase concentration of linear low-density polyethylene (LLDPE) in the formulation. As such, the physical strength of the polymeric composition may be enhanced while still obtaining the desired degradation effects of the alkoxylated ethylenically unsaturated compound. Enhancing the physical strength of the polymeric composition simply extends the period of degradation. It is worthwhile to note that several of the specimens of Sample A after 288 hours of UV exposure time had degraded to the point that physical testing could not be performed thereon.

It will be apparent from the foregoing that many other variations and modifications may be made in the methods and the compositions herein before described, by those having experience in this technology, without departing from the concept of the present invention. Accordingly, it should be clearly understood that the methods and the compositions referred to herein in the foregoing description are illustrative only and are not intended to have any limitations on the scope of the invention.

What is claimed is:

1. A degradable plastic composition comprising an admixture of a polyolefin and an effective amount of at lease one alkoxylated ethylenically unsaturated compound as a photo-sensitizer/readily auto-oxidizable organic additive for promoting degradation of said polyolefin, said additive substantially uniformly dispersed throughout said polyolefin, wherein said at least one alkoxylated ethylenically unsaturated compound has the formula

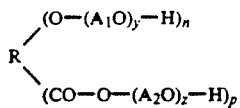

wherein
- R is an organic radical having a valence of n+p and is composed of carbon, hydrogen and, optionally, at least one heteroatom,
- n and p are each integers which are each greater than or equal to zero, but not both equal to zero,
- $A_1$ and $A_2$ are each an alkylene radical and may be the same or different alkylene radical, said alkylene radicals having at least one carbon-hydrogen bond which is activated, with respect to hydrogen-atom abstraction, by an adjacent oxygen atom,
- $(A_1O)_y$ and $(A_2O)_z$ are each a plurality of oxyalkylene units composed of the same or different oxyalkylene units within each plurality, and
- y and z are each integers having a value of 2 to 100 and wherein said at least one alkoxylated ethylenically unsaturated compound is selected from the group consisting of alkoxylated ethylenically unsaturated natural oils, alkoxylated ethylenically unsaturated fatty-acids and esters thereof, and alkoxylated ethylenically unsaturated fatty-alcohols and esters thereof.

2. The degradable plastic composition according to claim 1, further comprising a naturally occurring biodegradable product.

3. The degradable plastic composition according to claim 1 wherein said at least one alkoxylated ethylenically unsaturated compound is an alkoxylated ethylenically unsaturated natural oil.

4. The degradable plastic composition according to claim 3 wherein said alkoxylated ethylenically unsaturated natural oil is alkoxylated castor oil.

5. The degradable plastic composition according to claim 1 wherein the degradable plastic composition comprises about 50 to about 99.9 percent by weight of the polyolefin and about 50 to about 0.1 percent by weight of the alkoxylated ethylenically unsaturated compound.

6. The degradable plastic composition according to claim 1 wherein the degradable plastic composition comprises about 98 percent to about 90 percent by weight low-density polyethylene, about 1 to about 5 percent by weight linear low-density polyethylene, and about 1 to about 5 percent by weight ethoxylated castor oil.

7. A degradable plastic composition comprising and admixture of an organic polymeric material and a degradation-controlling amount of an additive system consisting essentially of at least one alkoxylated ethylenically unsaturated compound as a photo-sensitizer/readily auto-oxidizable organic additive and at least one other readily auto-oxidizable substance, wherein said additive system is substantially uniformly dispersed throughout said polymeric material and wherein said organic polymeric material is a polyolefin and wherein said at least one alkoxylated ethylenically unsaturated compound has the formula

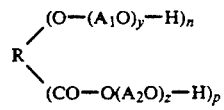

wherein
- R is an organic radical having a valence of n+p and is composed of carbon, hydrogen and, optionally, at least one heteroatom,
- n and p are each integers which are each greater than or equal to zero, but not both equal to zero,
- $A_1$ and $A_2$ are each an alkylene radical and may be the same or different alkylene radical, said alkylene radicals having at least one carbon-hydrogen bond which is activated, with respect to hydrogen-atom abstraction, by an adjacent oxygen atom,
- $(A_1O)_y$ and $(A_2O)_z$ are each a plurality of oxyalkylene units composed of the same of different oxyalkylene units within each plurality, and
- y and z are each integers having a value of 2 to 100 and wherein said at least one alkoxylated ethylenically unsaturated compound is selected from the group consisting of alkoxylated ethylenically unsaturated natural oils, alkoxylated ethylenically unsaturated fatty-acids and esters thereof, and alkoxylated ethylenically unsaturated fatty-alcohols and esters thereof.

8. The degradable plastic composition according to claim 7, further comprising a naturally occurring biodegradable product.

9. The degradable plastic composition according to claim 7, wherein said at least one alkoxylated ethylenically unsaturated compound is an alkoxylated ethylenically unsaturated natural oil.

10. The degradable plastic composition according to claim 9 wherein said alkoxylated ethylenically unsaturated natural oil is alkoxylated castor oil.

11. The degradable plastic composition according to claim 7 wherein the degradable plastic composition comprises about 50 to about 99% by weight of a polyolefin; about 0.01 to about 50% by weight of said alkoxylated ethylenically unsaturated compound; and from 0 to about 25% by weight of said other readily auto-oxidizable organic substance.

* * * * *